United States Patent Office 3,068,578
Patented Dec. 18, 1962

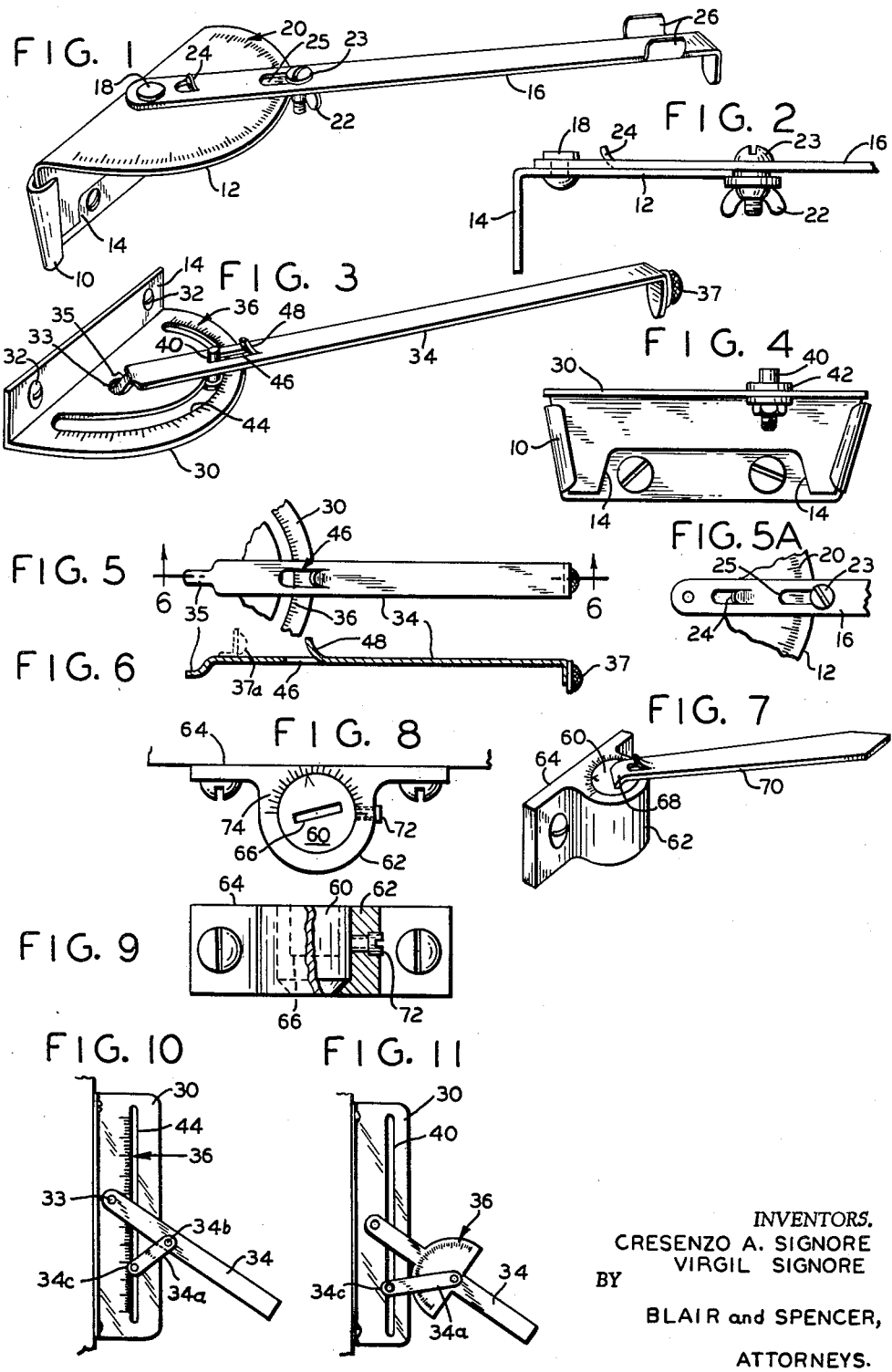

3,068,578
LOCATING DEVICES
Cresenzo A. Signore, 466 Fairfield Ave., and Virgil Signore, 472 Fairfield Ave., both of Stamford, Conn.
Filed May 26, 1958, Ser. No. 737,595
4 Claims. (Cl. 33—75)

This invention relates to location indicating devices, and, more particularly, to devices which may be permanently or temporarily installed on the side of a structure or building and employed to indicate the location of buried objects nearby, such as fuel tanks, fuel pipes, septic tanks, and the like.

The location of buried or camouflaged objects presents a serious problem when the exact locations of such objects are forgotten for long periods of time. When they must be found, much searching and excavation is sometimes required to locate them. The present invention provides a convenient and economical means for locating such buried or hidden objects after a period of time has elapsed, and for locating small objects which are hidden by trees, growing grass and underbrush, fallen leaves, snow, and so forth.

The objects which may thus be located include the fill pipes for buried fuel tanks, septic tanks, tile drains, artesian wells and utility company equipment, such as buried transformers, electrical cables, junction boxes, gas lines, steam pipes, water mains, sewers, etc. The location of oil tank fill pipes covered by snow or fallen leaves presents one particular problem which is conveniently solved by the use of our invention.

One object of the invention is to provide an economical means for locating permanently buried objects such as electrical cables and conduits, and pipes for carrying gas, steam, water, or the like. A further object of the invention is to provide a locating device of the above character for indicating the position of access means to buried objects, such as manholes and oil tank fill pipes which are buried by snow, fallen leaves or the like. An additional object is to provide an indicating device of the above character which may be permanently installed on nearby structures or buildings. Another object of the invention is to provide indicating devices of the above character, part of which may be permanently installed on nearby posts or structures, and the remainder of which may be stored in convenient places or carried by telephone repair men, fuel truck drivers, or utility workers using the device to locate the objects in question. A further object of the invention is to provide an indicating device of the above character in which the portion of the device permanently attached to a structure may be set and locked in a permanent indicating position and an indicating element may be inserted or fitted into said permanent portion whenever the direction indication is needed. Other objects of the invention will in part be obvious and will in part appear hereinafter.

The invention accordingly comprises an article of manufacture possessing the featues, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings, in which:

FIGURE 1 is a perspective view of one form of the invention shown temporarily installed in a permanent bracket on the wall of a building;

FIGURE 2 is a sectional side elevation of part of the same form of the invention shown in FIGURE 1;

FIGURE 3 is a perspective view of another form of the invention shown permanently installed on the side of a building, with which a removable indicating element may be employed;

FIGURE 4 is a sectional front elevation of a modification of the form of the invention shown in FIGURE 3;

FIGURE 5 is a top plan view of the indicating element shown in the form of the invention in FIGURE 3;

FIGURE 5A is a partial top plan view of the indicating element shown in the form of the invention of FIGURE 1;

FIGURE 6 is a side elevation, partially in section, of the indicating element shown in FIGURE 5;

FIGURE 7 is a perspective view of another embodiment of the invention;

FIGURE 8 is a top plan view of the embodiment of FIGURE 7;

FIGURE 9 is a front elevation, partially in section, of the embodiment of FIGURE 7;

FIGURE 10 is a top plan view of a further embodiment of the invention; and

FIGURE 11 is a top plan view of an additional embodiment of the invention.

Our invention provides an economical and useful indicating device which may be installed, either permanently or temporarily, on a post or structure or on the wall of a building, and used to indicate the location of objects nearby. The invention includes a scale plate, unique pivot means within said scale plate, radially disposed selectively adjustable angular position determining means and, if desired, securing means for joining a removable linear measuring means to said angular position determining means. The scale plate may be permanently attached to a building or it may be combined with the position determining means in such a way that the combination may be inserted in an appropriate bracket mounted on the building and set to indicate the location of the object.

In the permanently combined form of our invention shown in FIGURE 1, bracket 10 is permanently affixed to a structure near the buried object, preferably at the time the object is originally buried. Bracket 10 may be affixed by any suitable means, such as screws, nails, metal bands threaded through suitable slots in bracket 10, etc. Scale plate 12 is provided with projecting flange 14, adapted to fit snugly into bracket 10 and to hold scale plate 12 firmly in position when the device is to be used to indicate location. Scale plate 12 is provided with scale 20, indicating directions from pin 18 in any convenient units, such as degrees of the 360 degree navigators' circle. Indicator 16 is rotatably joined to scale plate 12 by pin or rivet 18. Indicator 16 may be positioned in any direction shown on scale 20, and fixed in the desired position by a suitable means such as wing nut 22 mounted on screw 23 and adapted to clamp indicator 16 to element 12 in any desired position along scale 20. Hole 25 in indicator 16 is adapted to receive screw 23, and is elongated to permit the reading of scale 20 therethrough, as shown in FIGURE 5A. Projection 24 projects from indicator 16 to provide a peg or hook over which the end loop of a measuring tape may be placed. Ears 26 projecting upwardly from the edges of indicator 16 near its outer end provide a guide for the measuring tape, and these ears will tend to twist the tape unless it is stretched directly between them along indicator 16.

A different form of the invention is shown in FIGURE 3. Here, a permanent scale plate 30 is attached to a structure by its flange 14 using any suitable means such as screws 32. Scale plate 30 is provided with hole 33 in substantially the same position as pin 18 in the embodiment as shown in FIGURE 1. Arm 35 of indicating element 34 fits into hole 33 and may be positioned in any direction indicated by scale 36 on scale element 30. Scale plate 30 is also provided with slot 44 in which guide pin 40 may be positioned. As shown in FIGURE 4, guide pin 40 may be provided with shoulder 42 of larger diameter than the width of slot 44 and guide pin 40 may have a threaded portion extending through slot 44 with a nut attached to clamp guide pin 40 in any desired location along slot 44 indicated by the scale 36. Alternatively, pin 40 may be clamped by an "Allen Head" set screw, not shown, to minimize possible tampering with the setting. Indicator 34 is provided with hole 46 which may be aligned and interfitted with guide pin 40 so that indicator 34 points in the direction determined by hole 33 and pin 40. Hole 46 in indicator 34 is elongated to permit the reading of scale 36 therethrough, as shown in FIGURE 5, and hole 46 is punched in such a way that projection 48 is raised above the surface of indicator 34, providing a hook or peg over which the end loop of a tape measure may be placed. In FIGURE 4, a scale plate 30 is provided with a flange 12 adapted to fit into a bracket 10 like the bracket shown in FIGURE 1. Indicator 34 may be fitted to this scale plate 30 just as is shown in FIGURE 3. If desired, the outer end of indicator elements 16 and 34 may be brightly painted or colored for increased visibility and may be adapted to carry a reflector 37, or to support a small flashlight (not shown) to facilitate the use of the invention after dark. If reflector 37 is mounted as shown in FIGURES 3 and 6, and a second reflector 37a, shown in FIGURE 6 is mounted near the scale plate end of the indicator element, the two reflectors may be illuminated by a flashlight aimed by the user, who can move until the reflectors are aligned vertically in the manner of marine navigation range beacons, thus confirming accurately the user's position with respect to the indicated direction.

It will now be seen that the forms of the invention shown in FIGURES 1, 2 and 3 all provide an indication of the angular direction toward the object to be located. For convenient use, the distance to the object may be stamped directly on the device, for example, on the scale plate 30 of FIGURE 3 or on bracket 10 in FIGURES 1 and 2. A tape measure hooked over projection 24 or 48 and carried out to the prescribed distance in the direction indicated by the indicator 16 or 34 will thus locate the object.

Indicator 34 is shown in more detail in FIGURES 5 and 6, to illustrate more clearly the preferred form of the arm 35 to be inserted into hole 33, in the scale plate 30 of FIGURE 3. FIGURES 5 and 6 also show the preferred shape of projection 48, provided to furnish a hook for the end ring of a measuring tape to be used with the invention.

As demonstrated by the forms of the invention shown in FIGURES 1 through 4, there are essentially three elements incorporated in the invention: a mounting element, an adjustable element, and an indicating element. Thus, in the embodiment shown in FIGURE 1, bracket 10 is the mounting element, scale plate 12 is the adjustable element, and indicator 16 is the indicating element. By comparing the embodiments shown in the other figures, it will also be seen that the adjustable element may be combined with the mounting element, as shown in FIGURE 3, and in FIGURES 7, 8 and 9, described in detail below. Alternatively, the adjustable element may be combined with the indicating element, as shown in FIGURES 1 and 2, and also in FIGURES 10 and 11, further described below. The three elements of the invention may, of course, be employed separately, as shown in FIGURE 4.

Another embodiment of the invention is shown in FIGURES 7, 8, and 9. In this embodiment, a permanently mounted bracket member 64 is provided with a cylindrical sleeve 62, the upper surface of which is marked with a suitable scale 74. Rotatable cylinder 60 is positioned within the sleeve 62 which and acts as the adjustable element. Rotatable cylinder 60 is provided with a suitable socket 66 in its upper portion adapted to receive flange 68 of indicating element 70. Set-screw 72, preferably of the "Allen Head" type, is mounted in the wall of sleeve 62 and bears against cylinder 60, permitting the permanent adjustment of cylinder 60 in any direction indicated by scale 74. When the permanently adjusted instrument is to be used, removable indicator 70 is installed by inserting its flange 68 into socket 66, and it then indicates the direction of the object.

FIGURE 10 shows still another form of the invention in which plate 30 is permanently mounted on a building or structure and provided with a slot 44 and a graduated scale 36. Plate 30 is also provided with hole 33 adapted to receive a projection on the end of indicator 34. Arm 34a is pivotally connected to indicator 34 by pin 34b, and arm 34a is provided with a projection 34c fitting in slot 44. Scale 36 may be calibrated so that the position of projection 34c in slot 44 governs the direction shown by indicator 34.

FIGURE 11 shows a further modification of the form of invention shown in FIGURE 10. In FIGURE 11, scale 36 is shown mounted directly on indicator 34 and arm 34a is positioned in slot 44 only after its angle with respect to indicator 34 has been determined by adjusting it on scale 36 and clamping it in position by any suitable clamping means.

As shown above, the invention provides a convenient indication of the distance and direction to any buried or hidden object. The distance and direction may be stamped directly on bracket 10 as shown in FIGURE 2 or on scale plate 30 as shown in FIGURE 3. Alternatively, the distance and direction may be recorded elsewhere. When such a device is used to indicate the location of oil tank fill pipes hidden by snow or fallen leaves, for example, the oil truck driver customarily carries an order book in which each customer's "Addressograph" plate stamp may include the distance and direction to the customer's fill pipe. If the oil truck driver is equipped with a form of the invention wherein the indicating element (the scale plate) and the adjustable element (the angular position determining means) are combined, such as that shown in FIGURE 2, to be used with bracket 10 as shown in FIGURE 1, he may adjust the device by moving indicator 16 on scale 20 to the necessary angle and setting indicator 16 at that angle by tightening wing nut 22. He may then insert the flange 14 of adjustable element 12 into bracket 10, slip the loop of a tape measure over projection 48, and by carrying the tape measure in the direction indicated by indicator 16 while the tape unreels to the distance prescribed by the customer's "Addressograph" plate, he will then be at the location of the fill pipe. Utility company workmen using the invention to locate buried conduits, pipes and cables may likewise find the embodiment of FIGURE 1 to be the most useful and economical form of the invention for their purposes. By stamping each bracket 10 with a serial number, the angle and distance from each bracket to the desired object can be recorded serially, and the same combined indicator 16 and scale plate 14 shown in FIGURE 2 can be used with each of many brackets.

When an object such as a septic tank or a buried pipe or cable need not be located for a long period of time, the forms of the invention wherein the adjustable element is combined with the mounting element, such as that shown in FIGURE 3, may be more useful. Here, scale plate 30 may be permanently mounted on a nearby post or structure, and pin 40 may be permanently adjusted at the scale reading desired. Detachable indicator 34 can be inserted to show the location of the buried object whenever it must be found. The form of the invention shown in FIGURES 7, 8 and 9 would likewise be useful in such cases.

The same embodiment of the invention may, of course, be used to indicate the location of a plurality of objects in its vicinity. Thus, when installed on the outer wall of a home, it may indicate the location of an oil tank fill pipe, a septic tank, a dry well, one or more tile drains, etc. In this case the respective scale readings and distances for each object may be stamped in tabular form on the device itself, or they may be separately listed for convenient reference. If the form of the invention shown in FIGURE 3 is employed for this purpose, a plurality of guide pins 40 may be permanently installed, one for each object to be located.

If the invention is constructed of weatherproof material, such as stainless steel or bronze, it may be usefully employed for a period of many years. Since the invention comprises essentially three parts as shown above, viz., a mounting element, an adjustable element, and an indicating element, it will be seen that the elements permanently mounted and exposed to the weather are those which are preferably made of these weather-resisting materials. The detachable and removable elements may be made of any suitable material, such as metal or plastic. Thus, for example, in the first embodiment of the invention shown above, bracket 10, the mounting element which is permanently affixed to a structure near the object, is the only element which must preferably be constructed of highly weather-resistant material.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A device for locating the position of objects such as pipes, drains, cables, tanks, and the like, comprising, in combination, a scale plate having means forming a slot therethrough in the shape of a semi-circle, an integral flange on said plate for mounting said plate in a substantially horizontal position, an azimuth scale imprinted adjacent said slot on said scale plate, means forming a hole in said scale plate, said hole being substantially concentric with said slot, a vertical guide pin extending above said plate and variably positionable in said slot, means for securing said guide pin at any point along said slot, an indicator having an integral arm at one end, said arm extending downwardly for at least a portion of its length, an integral, upwardly projecting hook, and means forming a longitudinal slot adjacent said hook, said arm being readily insertable in and removable from said hole, said guide pin being readily insertable in and removable from said longitudinal slot, said longitudinal slot being positioned to permit simultaneous engagement of said guide pin and visibility of said azimuth scale therethrough, whereby a two-point positioning of said indicator by the insertion and engagement of said arm and said guide pin provides an azimuth guide for a linear measuring tape engaged with said hook.

2. The device defined in claim 1 wherein said indicator is provided with a reflector at the end opposite said arm whereby the indicator end is visible at night by reflected light.

3. The device defined in claim 2 wherein a second reflector is provided spaced longitudinally along said indicator from said first reflector for alignment of both reflectors for accurate azimuth orientation at night.

4. A locating device comprising, in combination, a scale plate having means forming a slot therethrough in the shape of a portion of a circle, means for mounting said plate in a substantially horizontal position, an azimuth scale on said scale plate adjacent said slot, means forming a hole in said scale plate, said hole being substantially concentric with said slot, a guide pin extending above said plate and variably positionable in said slot, means for securing said guide pin at any point along said slot, an indicator having an integral arm at one end thereof, said arm extending downwardly for at least a portion of its length, means forming a pin-receiving opening in said indicator, said opening being spaced from said arm a distance corresponding to the radius of said slot, and an upwardly projecting hook on said indicator, whereby said indicator is readily positionable in an azimuth indicating position by engagement of said arm in said hole and said guide pin in said opening to align a linear tape measure engaged with said hook.

References Cited in the file of this patent

UNITED STATES PATENTS

| | | |
|---|---|---|
| 419,615 | Stilwell | Jan. 14, 1890 |
| 1,091,246 | Roehrig | Mar. 24, 1914 |
| 1,345,289 | Tucker | June 29, 1920 |
| 2,549,950 | Walton | Apr. 24, 1951 |
| 2,611,185 | Thursack | Sept. 23, 1952 |
| 2,770,042 | Hone | Nov. 13, 1956 |

FOREIGN PATENTS

| | | |
|---|---|---|
| 2,813 | Great Britain | 1907 |